E. W. HOYT.
VALVE.
APPLICATION FILED NOV. 26, 1909.

952,043.

Patented Mar. 15, 1910.

Witnesses
Oliver W. Holmes
W. C. Healy

Inventor
E. W. Hoyt
James J. Sheehy
By
Attorney

UNITED STATES PATENT OFFICE.

EUGENE W. HOYT, OF DECORAH, IOWA.

VALVE.

952,043.

Specification of Letters Patent.   Patented Mar. 15, 1910.

Application filed November 26, 1909. Serial No. 529,929.

*To all whom it may concern:*

Be it known that I, EUGENE W. HOYT, citizen of the United States, residing at Decorah, in the county of Winneshiek and State of Iowa, have invented new and useful Improvements in Valves, of which the following is a specification.

My invention relates to reciprocating valves of the self-grinding type, and contemplates the provision of a durable and otherwise practical construction for preventing steam, alkali, dirt, etc., from reaching and deteriorating the thread of the stem, and for isolating the spring employed from the steam with a view of preventing the steam from affecting the tension of the spring.

Figure 1:
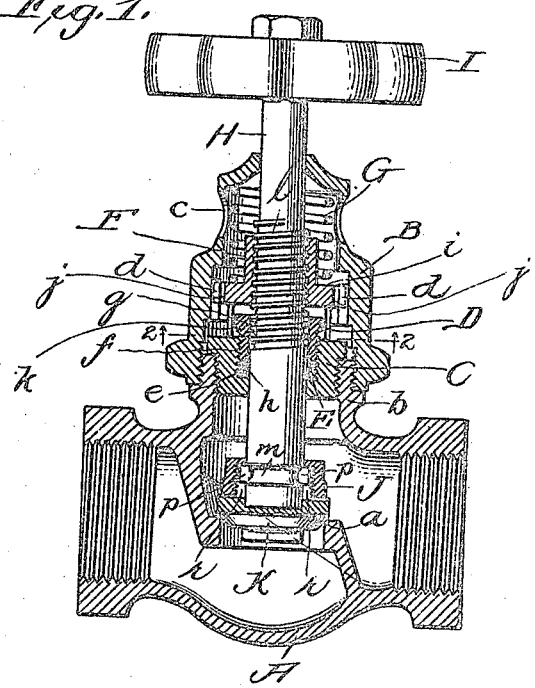
Figure 2:
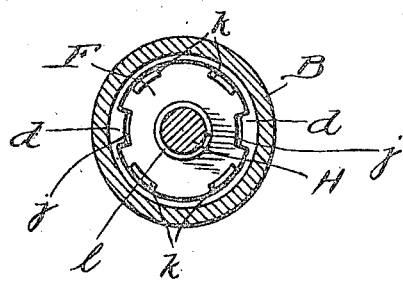
Figure 3:
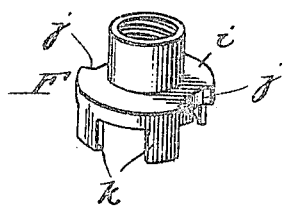

Other advantageous characteristics of the invention will be fully understood from the following description and claims when the same are read in connection with the drawings, accompanying and forming part of this specification, in which:

Figure 1 is a view, partly in elevation and partly in longitudinal vertical section, of a self-grinding valve constructed in accordance with my invention. Fig. 2 is a horizontal section, taken on the line 2—2 of Fig. 1, looking upward. Fig. 3 is a perspective view of the nut of the valve, removed.

Similar letters designate corresponding parts in all of the views of the drawings, referring to which:

A is the casing body of the valve, having the usual seat $a$ and also having an interiorly and exteriorly threaded neck $b$.

B is a bonnet threaded on said neck $b$ and having, by preference, openings $c$, and also having opposite, vertically disposed guide ribs $d$ in its inner side.

C is the major member of a stuffing box, which engages the interior thread of the neck $b$ and is flanged to bear on the upper end of said neck, and is chambered and interiorly threaded, as indicated by $e$ and $f$ respectively.

D is the minor member of the stuffing box which has a smooth bore $g$ and is provided with an exterior thread to engage the interior thread of the member C, and is also provided with a lower beveled end $h$, the latter being designed to rest over the packing E and crowd the same against the stem hereinafter referred to.

F is the interiorly threaded nut which is preferably flanged as indicated by $i$, and is provided in said flange with notches $j$ which receive the ribs $d$ of the bonnet B with a view of holding the nut against turning. The said nut is also provided with depending supporting means such as legs $k$ which bear on the upper side of the major member C of the stuffing box and surround the minor member D thereof.

G is a coiled spring interposed between the flange of the nut F and the top of the bonnet B and surrounding the upper reduced portion of said nut, and H is the stem that extends loosely through the aperture in the upper end of the bonnet B and also through the minor and major members D and C of the stuffing box, and is threaded at $l$ to engage the interior thread of the nut F. At its upper end the stem H is provided with a handle I suitably secured thereon and preferably in a detachable manner, and near its lower end the stem is provided with a circumferential groove $m$ and diametrically opposite lateral projections $p$ which are arranged in the same horizontal plane as the said groove. Surrounding the lower portion of the stem is a collar J having a depending and interiorly threaded flange, and receiving the lower end of the stem is a valve body K having an upwardly extending, exteriorly threaded flange $r$ which is notched at diametrically opposite points to receive the projections $p$ of the stem. Thus when the body K is placed on the lower end of the stem and engaged with the projections $p$, and the collar J is turned down into threaded engagement with the flange $r$ of body K, the body K will be connected to the stem in such manner as to turn and move vertically therewith. When, however, the collar J is turned upwardly and out of engagement with the threaded flange $r$ of the body K, the body is released from the stem and may then be readily replaced by a new body.

In the practical operation of my novel valve, it will be manifest that when the stem is turned to close the valve, the valve body K will first be moved to the seat $a$, and then by reason of the nut F moving upward on the thread $l$ of the stem, the spring G will be compressed and the continued turning of the stem H will be attended by turning and grinding of the body K against the seat $a$. Then when the stem is turned to open the valve, the valve body K will be ground against the seat $a$ until said body K is raised out of engagement with the seat.

It will be readily understood from the foregoing that while the stuffing box described will permit free vertical movement of the stem H and truly guide the same, said stuffing box will effectually prevent steam, alkali, dirt and other substance from reaching and injuring the thread l of the stem H, and the interior thread of the nut F, and will also prevent steam from reaching and affecting the spring. In this connection it will also be noticed that the openings c in the bonnet B permit the circulation of air in contact with the spring and in that way contribute toward keeping the spring cool so that it is not liable to lose its tension because of heat.

While I have shown and described one form of my invention, it is to be understood that I am not limited to the details or the form or relative arrangement of parts disclosed, but that extensive modifications may be made therein without departing from the spirit thereof.

Having described my invention, what I claim and desire to secure by Letters-Patent, is:

1. In a valve, the combination of a casing containing a seat, a nut movable toward and from said seat and held against turning in the casing, a spring interposed between the nut and the casing for pressing the nut toward the seat, a valve body for coöperating with the seat, a stem threaded through the nut and carrying the said body, and a stuffing box comprising a major member threaded into the casing and having an interior thread and a chamber and also having an aperture loosely receiving the stem, a minor member having a smooth bore loosely receiving the stem and an exterior thread engaging the interior thread of the major member and also having its lower end beveled downward and outward, and packing arranged in the chamber of the major member and between the same and the said beveled end of the minor member.

2. In a valve, the combination of a casing body containing a seat and having an interiorly and exteriorly threaded neck, a bonnet threaded on said neck and having an upper portion provided with apertures for the passage of air and also having interior guide ribs, an interiorly threaded nut movable in the bonnet and held against turning by the ribs thereof and having a depending portion, a stuffing box comprising a major member threaded into the neck of the casing body and bearing on said neck and having an interior thread and a chamber, packing disposed in said chamber, and a minor member having a smooth bore and also having an exterior thread for engaging the interior thread of the major member, whereby said minor member is enabled to compress the packing, a spring interposed between the nut and the outer end of the bonnet, and a stem extending through the bonnet, the nut and the stuffing box and having a thread engaging that of the nut, and a valve body carried by the stem and interposed between the stuffing box and the seat in the casing body.

In testimony whereof I have hereunto set my hand in presence of two subscribing witnesses.

EUGENE W. HOYT.

Witnesses:
E. A. WATERBURY,
J. H. HARGREAVES.